United States Patent Office 2,775,583
Patented Dec. 25, 1956

2,775,583

LEUCO SULFURIC ACID ESTERS OF ANTHRA-QUINONE-AZO-DYESTUFFS

Eduard Besler and Otto Braunsdorf, Frankfurt am Main, Germany, assignors to Farbwerke Hoechst Aktiengesellschaft vormals Meister Lucius und Bruning, Frankfurt am Main, Hochst, Germany No Drawing. Application May 29, 1952,
Serial No. 290,822

Claims priority, application Germany May 31, 1951

5 Claims. (Cl. 260—193)

The present invention relates to leuco sulfuric acid esters of anthraquinone-azo-dyestuffs; more particularly it relates to dyestuffs of the following general formula:

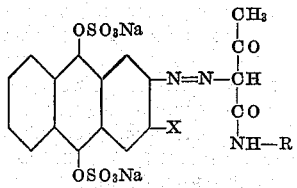

where X represents hydrogen or halogen and R represents a radical of the benzene series.

It is known to convert azo-dyestuffs from diazotized 1-amino-anthraquinone or its halogen substitution products and acetoacetylamino-benzenes into their leuco sulfuric acid esters by treating them with chlorosulfonic acid or other agents yielding sulfuric anhydride in the presence of a tertiary base and of a metal (German Patents Nos. 539,115, 723,132, 724,273 and 729,301). The dyestuffs so obtained are all derived from 1-amino-anthraquinone or its halogen derivatives which, however, are known for their special position in the chemistry of anthraquinones since, contrary to the isomeric 2-amino-anthraquinones, a great number of technically useful dyestuffs are derived therefrom and put on the market.

Now, we have found that valuable leuco sulfuric acid esters of anthraquinone-azo-dyestuffs are obtained by treating the azo-dyestuffs from diazotized 2-amino-anthraquinones and acetoacetylamino-benzenes with chlorosulfonic acid or other agents yielding sulfuric anhydride in the presence of a tertiary base and of a metal. The new leuco sulfuric acid esters yield yellow dyeings of a good dischargeability and of properties of fastness which entirely meet with the demands of the practice. The dyestuffs obtained by using acetoacetylamino-benzene as coupling component are distinguished by a very clear greenish yellow shade of fastness properties which could hitherto not be produced in the series of the leuco sulfuric acid esters. The dyestuffs of the present invention, therefore, constitute a valuable advance in the dyeing industry.

The following examples serve to illustrate the invention, but they are not intended to limit it thereto; the parts being by weight:

*Example 1*

80 parts of chlorosulfonic acid are slowly added drop by drop while cooling to 320 parts of a pyridine fraction boiling at a temperature of 125° C.–126° C. Into the mixture so obtained there is introduced at 35° C. a mixture of 30 parts of iron powder and 40 parts of the azo-dyestuff prepared by coupling diazotized 2-amino-3-chloroanthraquinone with acetoacetylamino-benzene. The mixture is then slowly heated to 50° C. and stirred at this temperature, until the esterification is complete which is the case when a clear deep red solution is obtained. The esterification mixture is stirred into 2000 parts of a sodium carbonate solution of 5 percent strength and the pyridine is removed by distillation under reduced pressure. The solution of the ester is freed from iron compounds and possible contaminations by filtration and the leuco sulfuric acid ester is salted out by gradually adding sodium chloride at a temperature of 80° C. to 90° C. After cooling to a temperature of 40° C. to 50° C. the ester is filtered with suction and stabilized by adding a small quantity of sodium carbonate. It corresponds to the following formula

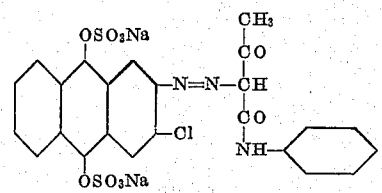

The leuco sulfuric acid ester so obtained yields on cotton, rayon or staple fiber from viscose, when developed in the usual manner with acid oxidizing agents, vivid greenish yellow shades which are distinguished by very good fastness properties.

By using the 2-amino-3-bromoanthraquinone as diazo-component instead of 2-amino-3-chloroanthraquinone, a dyestuff of similar properties is obtained.

*Example 2*

A mixture of 80 parts of an azo-dyestuff obtained by coupling diazotized 2-amino-3-chloroanthraquinone with acetoacetylamino-benzene and 60 parts of iron powder is introduced at a temperature of 35° C. to 40° C. into an esterification mixture prepared from 640 parts of alpha-picoline and 160 parts of chlorosulfonic acid at a temperature of 20° C. to 25° C.

The temperature of the reaction mixture is raised to 44° C. to 45° C. by external heating and then stirred at this temperature, until a clear red solution is obtained. This solution is poured, while stirring, on 2000 parts of ice and 20 parts of kieselguhr, whereby at first a dark red solution is obtained from which, after further stirring, the alpha-picoline salt of the leuco sulfuric acid ester separates in the form of small orange crystals. After allowing to stand for several hours, the picoline salt is filtered with suction, pressed and, in order to remove the picoline, dissolved in 4000 parts of a sodium carbonate solution of 4 percent strength and distilled under reduced pressure. After clarifying the ester solution the sodium salt of the leuco sulfuric acid ester is salted out by adding 10 percent of sodium chloride at a temperature of 80° C. to 85° C. It separates in the form of reddish yellow flakes which are filtered with suction after cooling. The ester is stabilized by addition of 2 percent of sodium carbonate.

The dyestuff so obtained has the same dyeing properties as the product prepared according to Example 1.

By replacing in the above example the acetoacetyl-aminobenzene by 1-acetoacetylamino-4-chlorobenzene, a dyestuff of similar properties is obtained. It corresponds to the following formula:

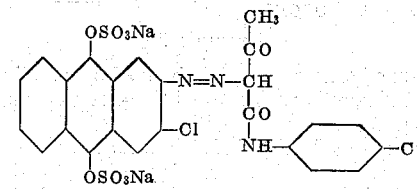

*Example 3*

80 parts of the azo-dyestuff obtained from diazotized 2-amino-3-chloroanthraquinone and 1-acetoacetylamino-2- methoxy-benzene are mixed with 60 parts of iron powder and then introduced into an esterification mixture prepared from 640 parts of alpha-picoline and 160 parts of chlorosulfonic acid and stirred. The temperature of the reaction mixture is raised to 50° C. and the mixture is stirred at this temperature until the esterification is complete. The reaction mixture is then poured into 4000 parts of a sodium carbonate solution of 5 percent strength and the picoline is removed by distillation under reduced pressure. The clarified ester solution is salted out by adding sodium chloride. The sodium salt of the leuco sulfuric acid ester forms a reddish yellow, flaky mass; it is filtered with suction and stabilized by pasting it with small quantities of water and sodium carbonate.

The leuco sulfuric acid ester so obtained yields on cotton, rayon or staple fiber from viscose reddish yellow dyeings and prints which are distinguished by good fastness properties.

*Example 4*

At a temperature of 20° C. to 25° C. an esterification mixture is prepared from 640 parts of a pyridine fraction boiling at a temperature of 125° C. to 130° C. and 160 parts of chlorosulfonic acid. The whole is heated to 35° C. and at this temperature there is introduced rather quickly a mixture of 60 parts of iron powder and 80 parts of the azo-dyestuff obtained from diazotized 2 - aminoanthraquinone and acetoacetylamino-benzene. The reaction mixture is then raised to a temperature of 45° C., it gradually assumes a reddish coloration and the dyestuff begins to dissolve. Before a complete solution is obtained brassy yellow, bright, small crystals, probably of a pyridine salt of the leuco sulfuric acid ester, separate. The mixture is then stirred at 45° C., until the esterification is complete. The reaction mass is then poured on 2000 parts of ice to which 20 parts of kieselguhr have been added while stirring, whereby the pyridine salt separates in ochre yellow small crystals. After standing for some time, the crystals are filtered with suction, pressed and the press cake is introduced, while stirring, into 4000 parts of a sodium carbonate solution of 4 percent strength. The pyridine is distilled under reduced pressure from the solution at a temperature of 35° C. to 40° C. When the distillation is finished, 20 parts of decolorizing carbon are added to the ester solution which is then heated to a temperature of 70° C. to 80° C., while stirring, clarified and the sodium salt of the leuco sulfuric acid ester is separated by gradually adding 10 percent of sodium chloride. The light yellow flaky precipitate so obtained is filtered with suction, after cooling to room temperature. By adding 2 percent of sodium carbonate the dyestuff paste is stabilized.

The leuco sulfuric acid ester obtained yields, when printed in the usual manner on cotton, rayon and staple fiber from viscose and developed with an acid oxidizing agent, vivid clear yellow shades which are distinguished by very good fastness properties. The dyestuff corresponds to the following formula:

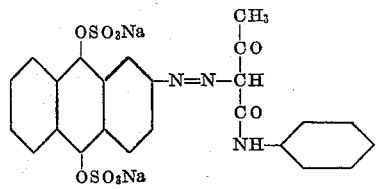

*Example 5*

40 parts of the azo-dyestuff obtained by coupling diazotized 2-aminoanthraquinone with 1-acetoacetylamino-4-chlorobenzene are mixed with 30 parts of iron powder and this mixture is introduced into an esterification mixture prepared from 400 parts of pyridine and 80 parts of chlorosulfonic acid. The reaction mixture is heated to 50° C. and stirred at this temperature, until unchanged dyestuff can no longer be detected. When this is the case, the brown-red solution is stirred into 2000 parts of a sodium carbonate solution of 6 percent strength and the pyridine is removed from the mixture by distillation under reduced pressure at about 40° C. The ester solution is freed from ferruginous mud and contaminations by filtration and the sodium salt of the leuco sulfuric acid ester is salted out from the clarified red-yellow solution by gradually adding 15 percent of sodium chloride. After allowing to stand for several hours, the precipitate is filtered with suction and made into a paste by adding small quantities of water and sodium carbonate.

The leuco sulfuric acid ester so obtained yields, when printed in the usual manner on cotton, rayon or staple fiber from viscose and developed with an acid oxidizing agent, reddish-yellow prints of very good fastness properties.

By replacing the azo-dyestuffs used in the preceding examples by the products obtained by coupling diazotized 2-aminoanthraquinones with other acetoacetylamino-benzenes, such as 1 - acetoacetylamino - 2 - chlorobenzene, 1-acetoacetylamino-2.5-dichlorobenzene, 1 - acetoacetylamino - 2 - methoxy-5-chlorobenzene, 1 - acetoacetylamino-4-methylbenzene, 1 - acetoacetylamino-2-methoxy-4-bromobenzene, 1 - acetoacetylamino - 2.4-dimethoxybenzene, 1-acetoacetylamino - 2.5 - dimethoxybenzene, 1-acetoacetylamino-2.5-dimethoxy-4-chlorobenzene, 1 - acetoacetylamino-2-methoxy-4-benzoylamino-5-chlorobenzene, 1 - acetoacetylamino-2-methyl-4.5-dichlorobenzene, 1-acetoacetylamino - 2 - methyl-5-methoxy-4-bromobenzene, 1 - acetoacetylamino-3-methoxy - 6 - chlorobenzene, and 1 - acetoacetylamino-2.5-diethoxy-4-bromobenzene, leuco sulfuric acid esters are obtained which are easily soluble in water and yield when dyed or printed according to the method usually applied with dyestuffs of this class, yellow shades of good fastness properties.

We claim:

1. The leuco sulfuric acid esters of anthraquinone-azo-dyestuffs corresponding to the following general formula

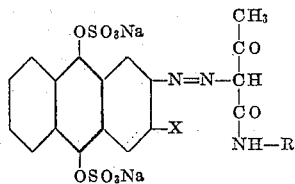

wherein X stands for a member of the group consisting of hydrogen, chlorine and bromine, and R represents a radical selected from the group consisting of benzene, chlorobenzene, dichlorobenzene, methoxybenzene, methoxychlorobenzene, methylbenzene, methoxy-bromobenzene, dimethoxy-benzene, dimethoxy-chlorobenzene, methoxybenzoylamino - chlorobenzene, methyl - dichlorobenzene, methyl-methoxy-bromobenzene and diethoxy-bromobenzene.

2. The leuco sulfuric acid esters of anthraquinone-azo-dyestuffs corresponding to the following general formula

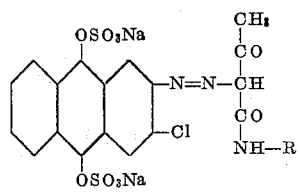

wherein R represents a radical selected from the group consisting of benzene, chlorobenzene, dichlorobenzene, methoxybenzene, methoxy-chlorobenzene, methylbenzene, methoxy-bromobenzene, dimethoxy-benzene, dimethoxy-chlorobenzene, methoxy - benzoylamino - chlorobenzene, methyl-dichlorobenzene, methyl-methoxy - bromobenzene and diethoxy-bromobenzene.

3. The leuco sulfuric acid ester of an anthraquinone-azo-dyestuff corresponding to the following formula

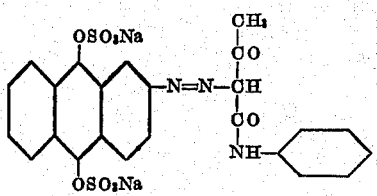

4. The leuco sulfuric acid ester of an anthraquinone-azo-dyestuff corresponding to the following formula

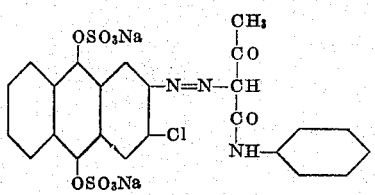

5. The leuco sulfuric acid ester of an anthraquinone-azo-dyestuff corresponding to the following formula

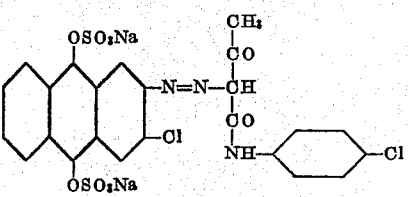

References Cited in the file of this patent
UNITED STATES PATENTS

| | | |
|---|---|---|
| 1,028,139 | Schmidt et al. | June 4, 1912 |
| 2,347,027 | Besler | Apr. 18, 1944 |
| 2,617,798 | Mueller et al. | Nov. 11, 1952 |

FOREIGN PATENTS

| | | |
|---|---|---|
| 873,968 | France | Apr. 13, 1942 |